United States Patent
Gewehr et al.

(10) Patent No.: US 12,478,066 B2
(45) Date of Patent: Nov. 25, 2025

(54) PESTICIDAL MIXTURES

(71) Applicant: BASF SE, Ludwigshafen (DE)

(72) Inventors: Markus Gewehr, Limburgerhof (DE); Jurith Montag, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 1025 days.

(21) Appl. No.: 17/428,299

(22) PCT Filed: Feb. 12, 2020

(86) PCT No.: PCT/EP2020/053584
§ 371 (c)(1),
(2) Date: Aug. 4, 2021

(87) PCT Pub. No.: WO2020/173705
PCT Pub. Date: Sep. 3, 2020

(65) Prior Publication Data
US 2022/0202014 A1  Jun. 30, 2022

(30) Foreign Application Priority Data
Feb. 25, 2019 (EP) ................................ 19159037

(51) Int. Cl.
*A01N 43/713* (2006.01)
*A01N 43/40* (2006.01)
*A01P 3/00* (2006.01)

(52) U.S. Cl.
CPC .......... *A01N 43/713* (2013.01); *A01N 43/40* (2013.01); *A01P 3/00* (2021.08)

(58) Field of Classification Search
CPC .......... A01N 43/713; A01N 43/40; A01P 3/00
See application file for complete search history.

(56) References Cited

FOREIGN PATENT DOCUMENTS

| AU | 2017257833 A1 | 10/2018 |
| EP | 3025585 A1 | 6/2016 |
| EP | 3025586 A1 | 6/2016 |
| EP | 3269246 A1 | 1/2018 |
| EP | 3329777 A1 | 6/2018 |
| WO | WO-2013/162072 A1 | 10/2013 |
| WO | WO-2016109257 A1 * | 7/2016 ............... A01G 7/06 |
| WO | WO-2016/122802 A1 | 8/2016 |
| WO | WO-2018/050508 A1 | 3/2018 |
| WO | WO-2019/007717 A1 | 1/2019 |

OTHER PUBLICATIONS

Jorgensen, Annu. Rev. Phytopathol. 2017. 55:181-203 (Year: 2017).*
Jeschke, Pest Manag Sci, 2018; 74:2389-2404 (Year: 2018).*
Liu, Molecular Diversity, 2019, 23:809-820 (Year: 2019).*
Suemoto, Pest. Manag. Sci. 2019; 75:1181-1189 (Year: 2018).*
International Application No. PCT/EP2020/053584, International Search Report and Written Opinion, mailed Mar. 18, 2020.
"Catalogue of pesticide formulation types and international coding system", Technical Monograph No. 2, Crop Life International, 6th edition, May 2008, 7 pages.
European Search Report for EP Patent Application No. 19159037.1, Issued on Apr. 26, 2019, 5 pages.
Colby, "Calculating Synergistic and Antagonistic Responses of Herbicide Combinations", Weeds, vol. 15, Issue 1, Jan. 1967, pp. 20-22.

* cited by examiner

Primary Examiner — Jeffrey H Murray
Assistant Examiner — Luisalberto Gonzalez
(74) Attorney, Agent, or Firm — MARSHALL, GERSTEIN & BORUN LLP

(57) ABSTRACT

A method for controlling phytopathogenic pests on cereals, wherein the pest, their habitat, breeding grounds, their locus or the plants to be protected against pest attack, the soil or plant propagation material are treated with an effective amount of a fungicidal mixture comprising, as active components, 1) 1-[2-[[1-(4-chlorophenyl)pyrazol-3-yl]oxymethyl]-3-methyl-phenyl]-4-methyl-tetrazol-5-one as compound I, and 2) one fungicidal compound II selected from [2,2-bis(4-fluorophenyl)-1-methyl-ethyl]2-[(3-acetoxy-4-methoxy-pyridine-2-carbonyl)amino]propanoate (compound 11-1) and [(1S)-2,2-bis(4-fluorophenyl)-1-methylethyl](2S)-2-[(3-acetoxy-4-methoxy-pyridine-2-carbonyl)amino]propanoate (compound II-2).

8 Claims, No Drawings

PESTICIDAL MIXTURES

CROSS-REFERENCE TO RELATED APPLICATIONS

This is the U.S. national phase of International Application No. PCT/EP2020/053584, filed Feb. 12, 2020, which claims the benefit of European Patent Application No. 19159037.1, filed on Feb. 25, 2019, and.

The present invention relates to fungicidal mixtures comprising
1) 1-[2-[[1-(4-chlorophenyl)pyrazol-3-yl]oxymethyl]-3-methyl-phenyl]-4-methyl-tetrazol-5-one as compound I and
2) one fungicidal compound II selected from [2,2-bis(4-fluorophenyl)-1-methyl-ethyl] 2-[(3-acetoxy-4-methoxy-pyridine-2-carbonyl)amino]propanoate (compound II-1) and [(1S)-2,2-bis(4-fluorophenyl)-1-methyl-ethyl] (2S)-2-[(3-acetoxy-4-methoxy-pyridine-2-carbonyl)amino]propanoate (compound II-2).

Moreover, the invention relates to a method for controlling pests, this includes animal pests and harmful fungi, using the inventive mixtures and the use of compound I and compound II for preparing such mixtures, and also compositions comprising such mixtures.

Additionally, the present invention also comprises a method for protection of plant propagation material (preferably seed) from harmful fungi or comprising contacting the plant propagation materials (preferably seeds) with an inventive mixture in pesticidally effective amounts The term "plant propagation material" is to be understood to denote all the generative parts of the plant such as seeds and vegetative plant material such as cuttings and tubers (e. g. potatoes), which can be used for the multiplication of the plant. This includes seeds, roots, fruits, tubers, bulbs, rhizomes, shoots, sprouts and other parts of plants, including seedlings and young plants, which are to be transplanted after germination or after emergence from soil.

These young plants may also be protected before transplantation by a total or partial treatment by immersion or pouring. In a particular preferred embodiment, the term propagation material denotes seeds.

Additionally, the present invention also comprises a method for protection of plant propagation material (preferably seed) from harmful fungi comprising contacting the plant propagation materials (preferably seeds) with the inventive mixture in pesticidally effective amounts.

Moreover, the invention relates to a method for controlling harmful fungi using the inventive mixtures and to the use of the compounds present in the inventive mixtures for preparing such mixtures, and also to compositions comprising such mixtures.

The present invention further relates to plant-protecting active ingredient mixtures having synergistically enhanced activity of improving the health of plants and to a method of applying such inventive mixtures to the plants.

Compound I and analogues as well as its pesticidal activity and methods for producing it are known e.g. from WO 2013/162072. Compounds as well as their pesticidal activity and methods for producing them are known from known from WO 2016122802 and WO 2016109257.

One typical problem arising in the field of pest control lies in the need to reduce the dosage rates of the active ingredient in order to reduce or avoid unfavorable environmental or toxicological effects whilst still allowing effective pest control.

In regard to the instant invention the term pests embrace harmful fungi and animal pests.

Another problem encountered concerns the need to have available pest control agents which are effective against a broad spectrum of harmful fungi and harmful animal pests.

There also exists the need for pest control agents that combine knock-down activity with prolonged control, that is, fast action with long lasting action.

Another difficulty in relation to the use of pesticides is that the repeated and exclusive application of an individual pesticidal compound leads in many cases to a rapid selection of pests, that means animal pests, and harmful fungi, which have developed natural or adapted resistance against the active compound in question. Therefore, there is a need for pest control agents that help prevent or overcome resistance.

Another problem underlying the present invention is the desire for compositions that improve plants, a process which is commonly and hereinafter referred to as "plant health".

The term plant health comprises various sorts of improvements of plants that are not connected to the control of pests. For example, advantageous properties that may be mentioned are improved crop characteristics including: emergence, crop yields, protein content, oil content, starch content, more developed root system (improved root growth), improved stress tolerance (e.g. against drought, heat, salt, UV, water, cold), reduced ethylene (reduced production and/or inhibition of reception), tillering increase, increase in plant height, bigger leaf blade, less dead basal leaves, stronger tillers, greener leaf color, pigment content, photosynthetic activity, less input needed (such as fertilizers or water), less seeds needed, more productive tillers, earlier flowering, early grain maturity, less plant verse (lodging), increased shoot growth, enhanced plant vigor, increased plant stand and early and better germination; or any other advantages familiar to a person skilled in the art.

It was therefore an object of the present invention to provide pesticidal mixtures which solve the problems of reducing the dosage rate and/or enhancing the spectrum of activity and/or combining knock-down activity with prolonged control and/or to resistance management and/or promoting the health of plants.

We have found that this object is in part or in whole achieved by the fungicidal mixtures comprising
1) metyltetraprol and
2) one fungicidal compound II selected from [2,2-bis(4-fluorophenyl)-1-methyl-ethyl] 2-[(3-acetoxy-4-methoxy-pyridine-2-carbonyl)amino]propanoate (compound II-1) and [(1S)-2,2-bis(4-fluorophenyl)-1-methyl-ethyl] (2S)-2-[(3-acetoxy-4-methoxy-pyridine-2-carbonyl)amino]propanoate (compound II-2).

Compound II-1 is a racemic mixture.

Especially, it has been found that the mixtures as defined in the outset show markedly enhanced activity against pests compared to the control rates that are possible with the individual compounds and/or is suitable for improving the health of plants when applied to plants, parts of plants, seeds, or at their locus of growth.

It has been found that the activity of the inventive mixtures comprising compound I and compound goes far beyond the fungicidal and/or plant health improving activity of the active compounds present in the mixture alone (synergistic activity).

Moreover, we have found that simultaneous, that is joint or separate, application of the compound I and the compound II or successive application of the compound I and the compound allows enhanced control of harmful fungi, compared to the control rates that are possible with the individual compounds (synergistic mixtures).

Moreover, we have found that simultaneous, that is joint or separate, application of the compound I and the compound II or successive application of the compound I and the compound provides enhanced plant health effects compared to the plant health effects that are possible with the individual compounds.

The ratio by weight of compound I and compound II in binary mixtures is from 10000:1 to 1:10000, from 500:1 to 1:500, preferably from 100:1 to 1:100 more preferably from 50:1 to 1:50, most preferably from 20:1 to 1:20, including also ratios from 10:1 to 1:10, 1:5 to 5:1, or 1:1.

In one embodiment the inventive mixture comprises compound I and compound II-1.

In one embodiment the inventive mixture comprises compound I and compound II-2.

All above-referred mixtures are herein below referred to as "inventive mixtures" or "mixtures according to the invention".

The inventive mixtures can further contain one or more insecticides, fungicides, herbicides.

The inventive mixtures can be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF).

These and further compositions types are defined in the "Catalogue of pesticide formulation types and international coding system", Technical Monograph No. 2, 6$^{th}$ Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

The resulting agrochemical compositions generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40%, in the ready-to-use preparations. Application can be carried out before or during sowing. Methods for applying the inventive mixtures and compositions thereof, respectively, on to plant propagation material, especially seeds include dressing, coating, pelleting, dusting, soaking and in-furrow application methods of the propagation material. Preferably, the inventive mixtures or the compositions thereof, respectively, are applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.01 to 1.0 kg per ha, and in particular from 0.05 to 0.75 kg per ha.

In treatment of plant propagation materials such as seeds, e. g. by dusting, coating or drenching seed, amounts of active substance of from 0.01-10 kg, preferably from 0.1-1000 g, more preferably from 1-100 g per 100 kilogram of plant propagation material (preferably seeds) are generally required.

When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and further pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary mixture may be mixed by the user himself in a spray tank or any other kind of vessel used for applications (e. g. seed treater drums, seed pelleting machinery, knapsack sprayer) and further auxiliaries may be added, if appropriate. Consequently, one embodiment of the invention is a kit for preparing a usable pesticidal composition, the kit comprising a) a composition comprising component 1) as defined herein and at least one auxiliary; and b) a composition comprising component 2) as defined herein and at least one auxiliary; and optionally c) a composition comprising at least one auxiliary and optionally a further active component 3) as defined herein.

As said above, the present invention comprises a method for controlling harmful fungi, wherein the pest, their habitat, breeding grounds, their locus or the plants to be protected against pest attack, the soil or plant propagation material (preferably seed) are treated with a pesticidally effective amount of an inventive mixture.

The inventive mixtures are especially suitable for controlling phytopathogenic pests on cereals.

According to the invention the pest, their habitat, breeding grounds, their locus or the plants to be protected against pest attack, the soil or plant propagation material are treated with an effective amount of a fungicidal mixture comprising, as active components compound I and compound II.

The inventive mixtures are particularly suitable for controlling wheat diseases caused by *Alternaria* spp. (*Alternaria* leaf spot), *Ascochyta tritici* (anthracnose), *Blumeria* (formerly *Erysiphe*) *graminis* (powdery mildew), *Botrytis cinerea* (teleomorph: *Botryotinia fuckeliana*: grey mold), *Cladosporium herbarum* (black ear), *Drechslera* (syn. *Helminthosporium*, teleomorph: *Pyrenophora*) *tritici-repentis* (tan spot), *Epicoccum* spp. (black mold), *Fusarium* (teleomorph: *Gibberella*) *graminearum* or *Fusarium culmorum* (root rot, scab or head blight), *Gaeumannomyces graminis* (take-all), *Microdochium* (syn. *Fusarium*) *nivale* (pink snow mold), *Mycosphaerella graminicola* (anamorph: *Septoria tritici*, *Septoria* blotch), *Polymyxa graminis*, *Pseudocercosporella herpotrichoides* (eyespot, teleomorph: *Tapesia yallundae*), *Puccinia graminis* (stem or black rust), *Puccinia recondita* (brown or leaf rust), *Pyrenophora* (anamorph: *Drechslera*) *triticirepentis* (tan spot), *Pythium* spp. (damping-off), *Rhizoctonia cerealis* (*Rhizoctonia* spring blight), *Septoria tritici* (*Septoria* blotch), *Stagonospora nodorum* (*Stagonospora* blotch, teleomorph: *Leptosphaeria* [syn. *Phaeosphaeria*] *nodorum*), *Tilletia. tritici* (syn. *Tilletia caries*, wheat bunt), *T. controversa* (dwarf bunt) or *Typhula incarnata* (grey snow mold).

The inventive mixtures are also particularly suitable for controlling barley diseases caused by *Ascochyta hordei*, *Bipolaris* (teleomorph: *Cochliobolus*, spot blotch) *sorokiniana*, *Blumeria* (formerly *Erysiphe*) *graminis* (powdery mildew), *Botrytis cinerea* (teleomorph: *Botryotinia fuckeliana*: grey mold), *Cladosporium herbarum* (black ear), *Claviceps purpurea* (ergot), *Cochliobolus* (anamorph: *Helminthosporium* of *Bipolaris*) *sativus*, *Drechslera* (syn. *Helminthosporium*, teleomorph: *Pyrenophora*) *teres*, *Epicoccum* spp. (black mold), *Fusarium* (teleomorph: *Gibberella*) *culmorum* (root rot, scab or head blight) on cereals (e.g. wheat or barley), *Gaeumannomyces graminis* (take-all), *Gibberella* spp. (e. g. *G. zeae*), *Helmintho-sporium* spp. (syn. *Drechslera*, teleomorph: *Cochliobolus*), *Microdochium* (syn. *Fusarium*) *nivale* (pink snow mold), *Mycosphaerella* spp., *Polymyxa* spp., *Pseudocercosporella herpotrichoides* (eyespot, teleomorph: *Tapesia yallundae*), *Puccinia recondita* (brown or leaf rust), *Pyrenophora* (anamorph: *Drechslera*) *teres* (net blotch), *Pyricularia grisea*, *Ramularia collo-cygni* (*Ramularia* leaf spots, Physiological leaf spots), *Rhizoctonia cerealis* (*Rhizoctonia* spring blight), *Rhynchosporium secalis* (scald), *Septoria* (syn. *Stagonospora*) *nodorum* (*Stagonospora* blotch), *Stagonospora* spp., *Tilletia* spp. (common bunt or stinking smut), *Typhula incarnata* (grey snow mold), or *Ustilago* spp. (loose smut), e. g. *U. nuda* and *U. avaenae*.

The inventive mixtures are particularly suitable for controlling wheat diseases caused by *Septoria tritici*, *Microduchium nivale*, *Erysiphe graminis tritici*, *Phaeospheria nodorum* or *Pyrenophera tritici-repentis*.

The inventive mixtures are also particularly suitable for controlling barley diseases caused by *Erysiphe graminis hordei*, *Pyrenophera teres*, *Ramularia collicygni* or *Rynchosporium secalis*.

The inventive mixtures are also particularly suitable for controlling wheat diseases caused by *Puccinia recondita* (brown or leaf rust), *Puccinia striiformis* (stripe or yellow rust), or *Puccinia graminis* (stem or black rust).

The inventive mixtures are also particularly suitable for controlling barley diseases caused by *Puccinia recondita* (brown or leaf rust), *Puccinia striiformis* (stripe or yellow rust), or *Puccinia graminis* (stem or black rust).

The mixtures according to the present invention are especially useful for controlling phytopathogenic fungi in cereals such as wheat, barley or rye, especially on wheat and barley.

In one especially preferred embodiment, the inventive mixtures are used for controlling the following phytopathogenic fungi on wheat: *Septoria tritici*, *Pyrenophera tritici-repentis*, *Microduchium nivale*, *Erysiphe graminis tritici* or *Phaeospheria nodorum*.

In one especially preferred embodiment, the inventive mixtures are used for controlling the following phytopathogenic fungi on barley: *Erysiphe graminis hordei*, *Pyrenophera teres*, *Ramularia collicygni* or *Rynchosporium secalis*.

In one especially preferred embodiment, the inventive mixtures are used for controlling the following phytopathogenic fungi on wheat, barley or rye: *Puccinia recondita* (brown or leaf rust), *Puccinia striiformis* (stripe or yellow rust), or *Puccinia graminis* (stem or black rust).

In preferred embodiments, the following inventive mixtures can be used on the following crops and pests:

| # | Compound I | Compound II | Crop | Disease |
|---|---|---|---|---|
| 1 | Metyltetraprol | II-2 | wheat | Microduchium nivale |
| 2 | Metyltetraprol | II-2 | wheat | Erysiphe graminis tritici |
| 3 | Metyltetraprol | II-2 | wheat | Septoria tritici |
| 4 | Metyltetraprol | II-2 | wheat | Phaeospheria nodorum |
| 5 | Metyltetraprol | II-2 | wheat | Pyrenophera tritici-repentis |
| 6 | Metyltetraprol | II-2 | wheat | Puccinia recondita |
| 7 | Metyltetraprol | II-2 | wheat | Puccinia striiformis |
| 8 | Metyltetraprol | II-2 | wheat | Puccinia graminis |
| 9 | Metyltetraprol | II-2 | barley | Erysiphe graminis hordei |
| 10 | Metyltetraprol | II-2 | barley | Pyrenophera teres |
| 11 | Metyltetraprol | II-2 | barley | Ramularia collicygni |
| 12 | Metyltetraprol | II-2 | barley | Rynchosporium secalis |
| 13 | Metyltetraprol | II-2 | barley | Puccinia recondita |
| 14 | Metyltetraprol | II-2 | barley | Puccinia striiformis |
| 15 | Metyltetraprol | II-2 | barley | Puccinia graminis |
| 16 | Metyltetraprol | II-2 | rye | Puccinia recondita |
| 17 | Metyltetraprol | II-2 | rye | Puccinia striiformis |
| 18 | Metyltetraprol | II-2 | rye | Puccinia graminis |

In general, "pesticidally effective amount" means the amount of the inventive mixtures or of compositions comprising the mixtures needed to achieve an observable effect on growth, including the effects of necrosis, death, retardation, prevention, and removal, destruction, or otherwise diminishing the occurrence and activity of the target organism. The pesticidally effective amount can vary for the various mixtures/compositions used in the invention. A pesticidally effective amount of the mixtures/compositions will also vary according to the prevailing conditions such as desired pesticidal effect and duration, weather, target species, locus, mode of application, and the like.

As said above, the present invention comprises a method for improving the health of plants, wherein the plant, the locus where the plant is growing or is expected to grow or plant propagation material, from which the plant grows, is treated with a plant health effective amount of an inventive mixture.

The term "plant effective amount" denotes an amount of the inventive mixtures, which is sufficient for achieving plant health effects as defined herein below. More exemplary information about amounts, ways of application and suitable ratios to be used is given below. Anyway, the skilled artisan is well aware of the fact that such an amount can vary in a broad range and is dependent on various factors, e.g. the treated cultivated plant or material and the climatic conditions.

When preparing the mixtures, it is preferred to employ the pure active compounds, to which further active compounds against pests, such as insecticides, herbicides, fungicides or else herbicidal or growth-regulating active compounds or fertilizers can be added as further active components according to need.

The inventive mixtures are employed by treating the fungi or the plants, plant propagation materials (preferably seeds), materials or soil to be protected from fungal attack with a pesticidally effective amount of the active compounds. The application can be carried out both before and after the infection of the materials, plants or plant propagation materials (preferably seeds) by the pests.

In the context of the present invention, the term plant refers to an entire plant, a part of the plant or the propagation material of the plant.

The inventive mixtures and compositions thereof are particularly important in the control of a multitude of phytopathogenic fungi on various cultivated plants, such as cereals, e. g. wheat, rye, barley, triticale, oats or rice; and on the plant propagation material, such as seeds, and the crop material of these plants.

Preferably, treatment of plant propagation materials with the inventive mixtures and compositions thereof, respectively, is used for controlling a multitude of fungi on cereals, such as wheat, rye, barley and oats; potatoes, tomatoes, vines, rice, corn, cotton and soybeans.

The term "cultivated plants" is to be understood as including plants which have been modified by breeding, mutagenesis or genetic engineering including but not limiting to agricultural biotech products on the market or in development. Genetically modified plants are plants, which genetic material has been so modified by the use of recombinant DNA techniques that under natural circumstances cannot readily be obtained by cross breeding, mutations or natural recombination. Typically, one or more genes have been integrated into the genetic material of a genetically modified plant in order to improve certain properties of the plant. Such genetic modifications also include but are not limited to targeted post-translational modification of protein (s), oligo- or polypeptides e. g. by glycosylation or polymer additions such as prenylated, acetylated or farnesylated moieties or PEG moieties.

Plants that have been modified by breeding, mutagenesis or genetic engineering.

Furthermore, plants are also covered that are by the use of recombinant DNA techniques capable to synthesize one or more insecticidal proteins.

Furthermore, plants are also covered that are by the use of recombinant DNA techniques capable to synthesize one or more proteins to increase the resistance or tolerance of those plants to bacterial, viral or fungal pathogens.

Furthermore, plants are also covered that are by the use of recombinant DNA techniques capable to synthesize one or more proteins to increase the productivity (e. g. bio mass production, grain yield, starch content, oil content or protein content), tolerance to drought, salinity or other growth-limiting environmental factors or tolerance to pests and fungal, bacterial or viral pathogens of those plants.

Furthermore, plants are also covered that contain by the use of recombinant DNA techniques a modified amount of substances of content or new substances of content, specifically to improve human or animal nutrition, e. g. oil crops that produce health-promoting long-chain omega-3 fatty acids or unsaturated omega-9 fatty acids (e. g. Nexera® rape, DOW Agro Sciences, Canada).

Furthermore, plants are also covered that contain by the use of recombinant DNA techniques a modified amount of substances of content or new substances of content, specifically to improve raw material production.

The separate or joint application of the compounds of the inventive mixtures is carried out by spraying or dusting the seeds, the seedlings, the plants or the soils before or after sowing of the plants or before or after emergence of the plants.

Customary application rates in the protection of materials are, for example, from 0.01 g to 1000 g of active compound per $m^2$ treated material, desirably from 0.1 g to 50 g per $m^2$.

For use in spray compositions, the content of the mixture of the active ingredients is from 0.001 to 80 weight %, preferably from 0.01 to 50 weight % and most preferably from 0.01 to 15 weight %.

The present invention offers the following advantages:

It provides pesticidal mixtures which solve the problems of reducing the dosage rate and/or excellent spectrum of activity and/or combining knock-down activity with prolonged control and/or to resistance management and/or promoting the health of plants.

EXPERIMENTS

Microtest

The active compounds were formulated separately as a stock solution having a concentration of 10000 ppm in dimethyl sulfoxide.

1. Activity Against Wheat Leaf Spots Caused by *Leptosphaeria nodorum* (LEPTNO)

The stock solutions were mixed according to the ratio, pipetted onto a micro titer plate (MTP) and diluted with water to the stated concentrations. A spore suspension of *Leptosphaeria nodorum* in an aqueous biomalt or yeast-bactopeptone-glycerine or DOB solution was then added. The plates were placed in a water vapor-saturated chamber at a temperature of 18° C. Using an absorption photometer, the MTPs were measured at 405 nm 7 days after the inoculation.

2. Activity Against *Microdochium nivale* (MONGNI)

The stock solutions were mixed according to the ratio, pipetted onto a micro titer plate (MTP) and diluted with water to the stated concentrations. A spore suspension of *Microdochium nivale* in an aqueous biomalt or yeast-bactopeptone-glycerine or DOB solution was then added. The plates were placed in a water vapor-saturated chamber at a temperature of 18° C. Using an absorption photometer, the MTPs were measured at 405 nm 7 days after the inoculation.

3. Activity Against Net Blotch *Pyrenophora teres* on Barley in the Microtiter Test (PYRNTE)

The stock solutions were mixed according to the ratio, pipetted onto a micro titer plate (MTP) and diluted with water to the stated concentrations. A spore suspension of a Qoi resistant isolate of *Pyrenophora teres* in an aqueous biomalt or yeast-bactopeptone-glycerine or DOB solution was then added. The plates were placed in a water vapor-saturated chamber at a temperature of 18° C. Using an absorption photometer, the MTPs were measured at 405 nm 7 days after the inoculation.

4. Activity Against *Rhynchosporium secalis* (RHYNSE)

The stock solutions were mixed according to the ratio, pipetted onto a micro titer plate (MTP) and diluted with water to the stated concentrations. A spore suspension of *Rhynchosporium secalis* in an aqueous biomalt or yeast-bactopeptone-glycerine or DOB solution was then added. The plates were placed in a water vapor-saturated chamber at a temperature of 18° C. Using an absorption photometer, the MTPs were measured at 405 nm 7 days after the inoculation.

5. Activity Against Leaf Blotch on Wheat Caused by *Septoria tritici* (SEPTTR)

The stock solutions were mixed according to the ratio, pipetted onto a micro titer plate (MTP) and diluted with water to the stated concentrations. A spore suspension of a Qoi resistant isolate of *Septoria tritici* in an aqueous biomalt or yeast-bactopeptone-glycerine or DOB solution was then added. The plates were placed in a water vapor-saturated chamber at a temperature of 18° C. Using an absorption photometer, the MTPs were measured at 405 nm 7 days after the inoculation.

The measured parameters were compared to the growth of the active compound-free control variant (100%) and the fungus-free blank value to determine the relative growth in % of the pathogens in the respective active compounds.

These percentages were converted into efficacies.

An efficacy of 0 means that the growth level of the pathogens corresponds to that of the untreated control; an efficacy of 100 means that the pathogens were not growing.

The expected efficacies of active compound mixtures were determined using Colby's formula [R. S. Colby, "Calculating synergistic and antagonistic responses of herbicide combinations", Weeds 15, 20-22 (1967)] and compared with the observed efficacies.

LEPTNO

| Active compound/ active mixture | Concentration (ppm) | Mixture | Observed efficacy | Calculated efficacy according to Colby (%) | Synergism (%) |
|---|---|---|---|---|---|
| Metyltetraprol | 0.016 | — | 49 | | |
| Florylpicoxamid | 0.004 | — | 13 | | |
| Metyltetraprol | 0.016 | 4:1 | 94 | 55 | 39 |
| Florylpicoxamid | 0.004 | | | | |

MONGNI

| Active compound/ active mixture | Concentration (ppm) | Mixture | Observed efficacy | Calculated efficacy according to Colby (%) | Synergism (%) |
|---|---|---|---|---|---|
| Metyltetraprol | 0.016 | — | 32 | | |
| | 0.004 | — | 1 | | |
| Florylpicoxamid | 0.063 | — | 44 | | |
| | 0.016 | — | 18 | | |
| | 0.004 | — | 3 | | |
| Metyltetraprol | 0.016 | 1:1 | 85 | 44 | 41 |
| Florylpicoxamid | 0.016 | | | | |
| Metyltetraprol | 0.016 | 4:1 | 61 | 34 | 27 |
| Florylpicoxamid | 0.004 | | | | |
| Metyltetraprol | 0.016 | 1:4 | 99 | 62 | 37 |
| Florylpicoxamid | 0.063 | | | | |
| Metyltetraprol | 0.004 | 1:16 | 95 | 44 | 51 |
| Florylpicoxamid | 0.063 | | | | |

PYRNTE Qoi restistant

| Active compound/ active mixture | Concentration (ppm) | Mixture | Observed efficacy | Calculated efficacy according to Colby (%) | Synergism (%) |
|---|---|---|---|---|---|
| Metyltetraprol | 0.063 | — | 11 | | |
| Florylpicoxamid | 0.063 | — | 9 | | |
| Metyltetraprol | 0.063 | 1:4 | 39 | 19 | 20 |
| Florylpicoxamid | 0.063 | | | | |

| RHYNSE | | | | | |
|---|---|---|---|---|---|
| Active compound/ active mixture | Concentration (ppm) | Mixture | Observed efficacy | Calculated efficacy according to Colby (%) | Synergism (%) |
| Metyltetraprol | 0.016 | — | 14 | | |
| Florylpicoxamid | 0.063 | — | 55 | | |
| Metyltetraprol Florylpicoxamid | 0.016 0.063 | 1:4 | 85 | 61 | 24 |

| SEPTTR Qoi resistant | | | | | |
|---|---|---|---|---|---|
| Active compound/ active mixture | Concentration (ppm) | Mixture | Observed efficacy | Calculated efficacy according to Colby (%) | Synergism (%) |
| Metyltetraprol | 0.063 | — | 1 | | |
|  | 0.016 | — | 0 | | |
|  | 0.004 | — | 1 | | |
| Florylpicoxamid | 0.063 | — | 12 | | |
|  | 0.016 | — | 0 | | |
| Metyltetraprol Florylpicoxamid | 0.063 0.063 | 1:1 | 50 | 13 | 37 |
| Metyltetraprol Florylpicoxamid | 0.063 0.016 | 4:1 | 38 | 1 | 37 |
| Metyltetraprol Florylpicoxamid | 0.016 0.063 | 1:4 | 41 | 12 | 29 |
| Metyltetraprol Florylpicoxamid | 0.004 0.063 | 1:16 | 40 | 13 | 27 |

The invention claimed is:

1. A method for controlling a phytopathogenic fungus on cereals, wherein the pest, its habitat, breeding grounds, its locus or the plant to be protected against fungus attack, soil or plant propagation material is treated with an effective amount of a fungicidal mixture comprising, as active components,
   1) 1-[2-[[1-(4-chlorophenyl)pyrazol-3-yl]oxymethyl]-3-methyl-phenyl]-4-methyl-tetrazol-5-one (compound I), and
   2) one fungicidal compound II selected from [2,2-bis(4-fluorophenyl)-1-methyl-ethyl]2-[(3-acetoxy-4-methoxy-pyridine-2-carbonyl)amino]propanoate (compound II-1) and [(1S)-2,2-bis(4-fluorophenyl)-1-methyl-ethyl](2S)-2-[(3-acetoxy-4-methoxy-pyridine-2-carbonyl)amino]propanoate (compound II-2), wherein a ratio by weight of compound I to compound II is from 50:1 to 1:50.

2. The method according to claim 1 for controlling a phytopathogenic fungus, wherein the phytopathogenic fungus is *Microduchium nivale, Erysiphe graminis tritici, Septoria tritici, Phaeospheria nodorum*, or *Pyrenophera tritici* on wheat.

3. The method according to claim 1 for controlling a phytopathogenic fungus, wherein the phytopathogenic fungus is *Erysiphe graminis hordei, Pyrenophera teres, Ramularia collicygni*, or *Rynchosporium secalis* on barley.

4. The method according to claim 1 for controlling a phytopathogenic fungus, wherein the phytopathogenic fungus is *Puccinia recondita* (brown or leaf rust), *Puccinia striiformis* (stripe or yellow rust), or *Puccinia graminis* (stem or black rust) on wheat, barley, or rye.

5. The method according to claim 1, wherein said fungicidal mixture is applied simultaneously either jointly or separately, or in succession.

6. The method according to claim 1 wherein the mixture comprises compound I and compound II-2 as active components.

7. The method according to claim 1 wherein the ratio by weight of compound I to compound II is from 20:1 to 1:20.

8. The method according to claim 6 wherein the ratio by weight of compound I to compound II is from 20:1 to 1:20.

* * * * *